Aug. 29, 1967     H. R. NORDIN     3,338,150
INJECTION MACHINE
Filed Sept. 27, 1965     4 Sheets-Sheet 1
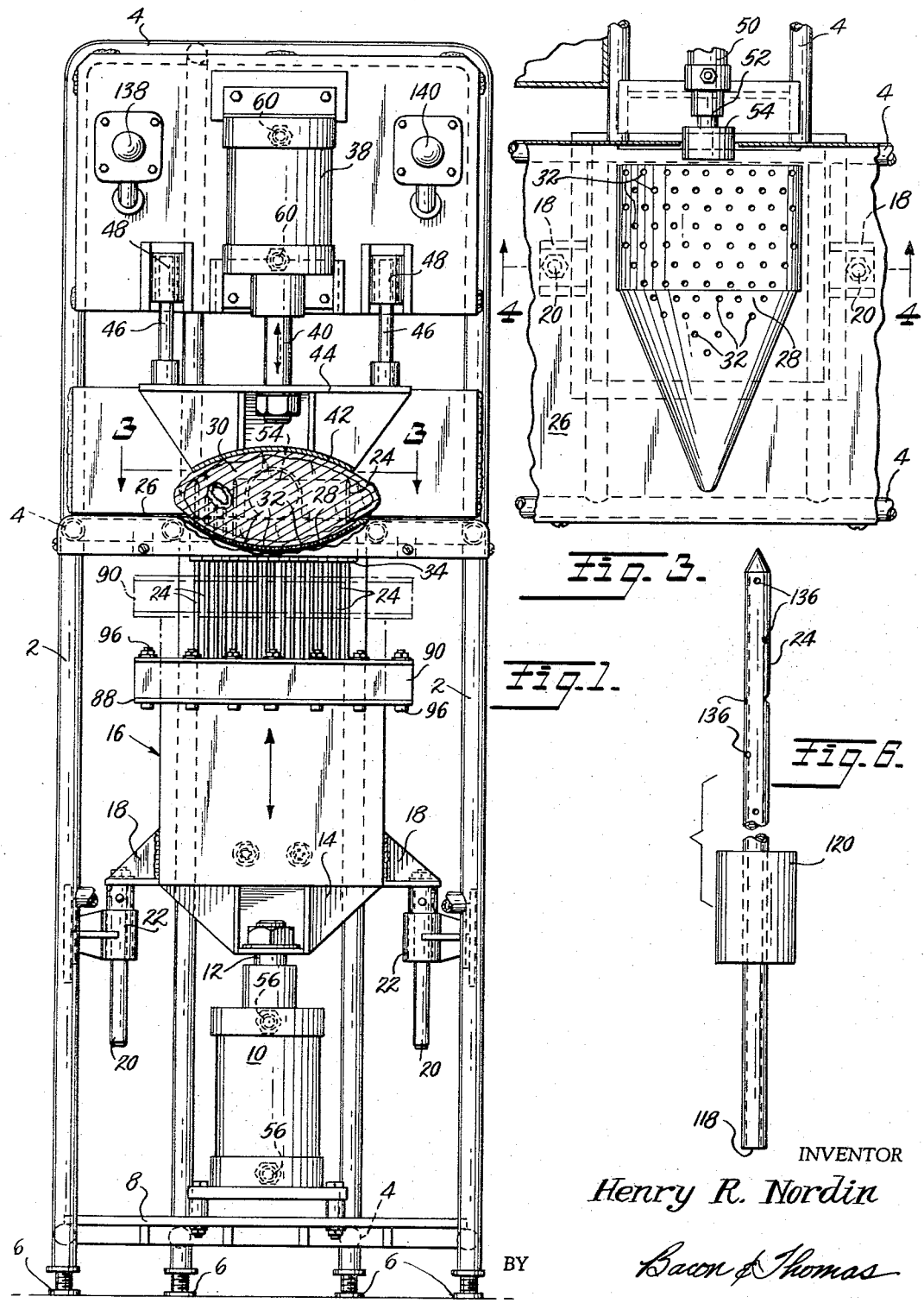
INVENTOR
Henry R. Nordin
BY Bacon & Thomas
ATTORNEYS

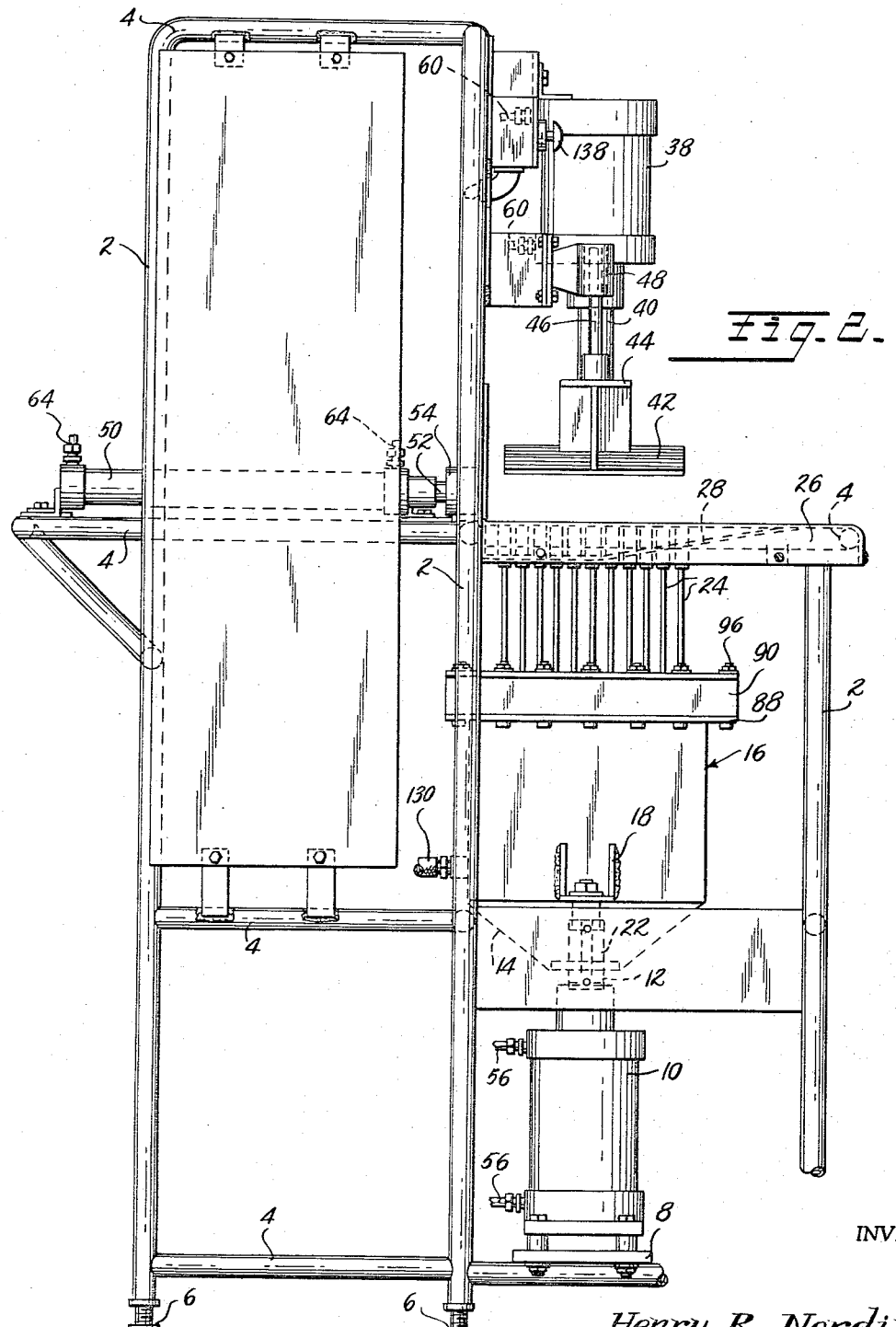

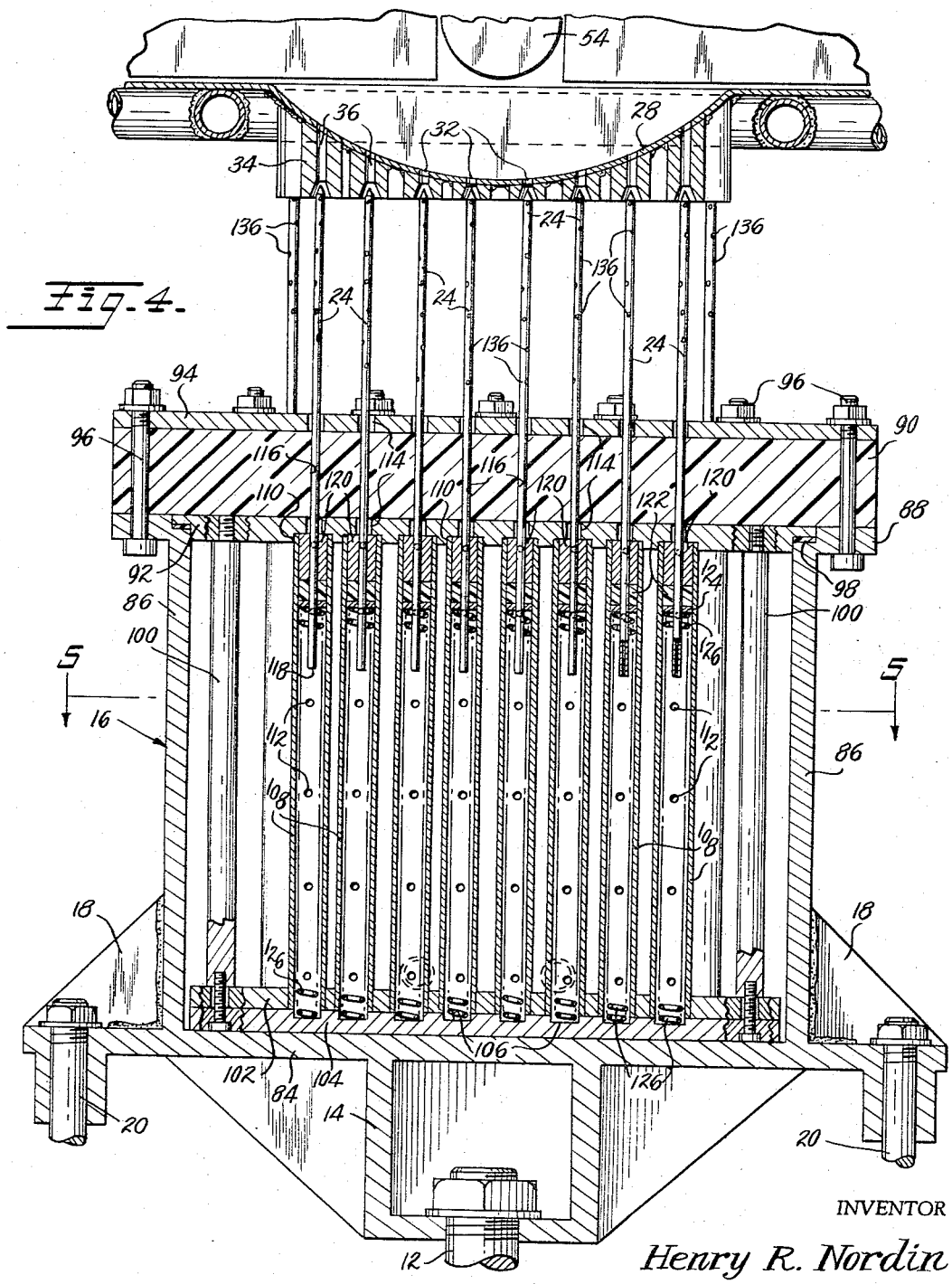

Aug. 29, 1967   H. R. NORDIN   3,338,150
INJECTION MACHINE
Filed Sept. 27, 1965   4 Sheets-Sheet 4
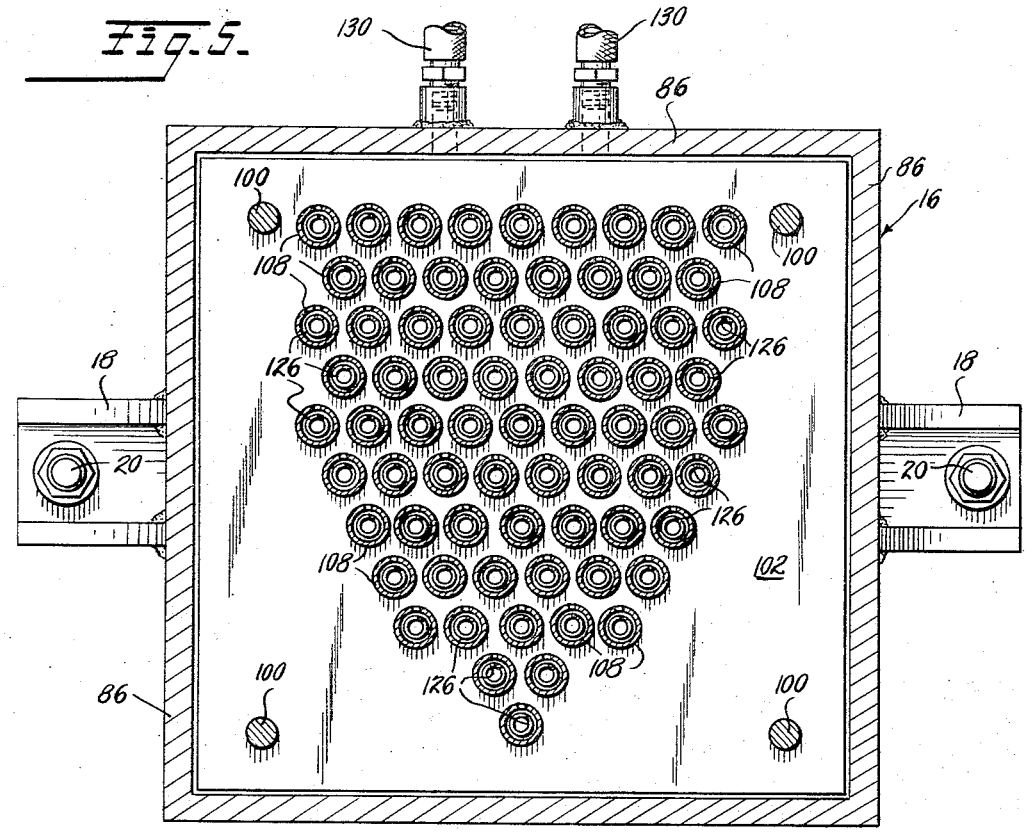
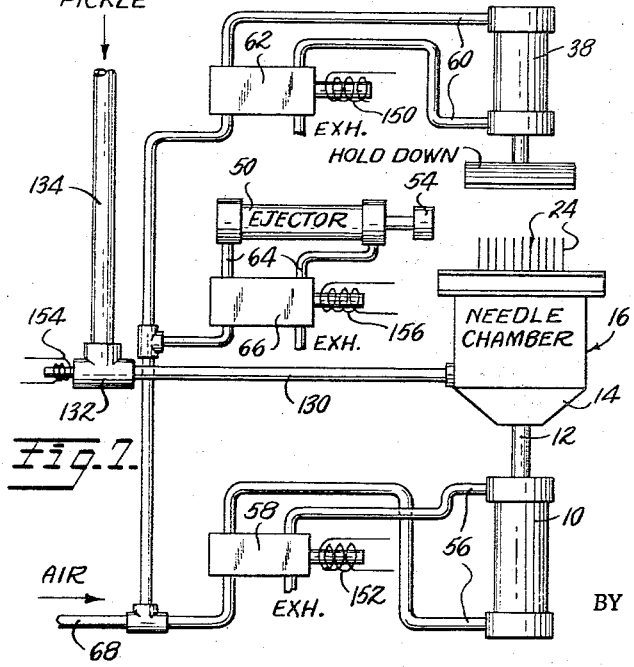
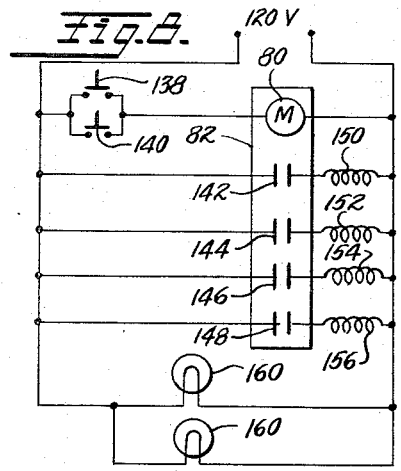
INVENTOR
Henry R. Nordin
Bacon & Thomas
BY
ATTORNEYS

# United States Patent Office 3,338,150
Patented Aug. 29, 1967

3,338,150
INJECTION MACHINE
Henry R. Nordin, Maple, Ontario, Canada, assignor to Canada Packers Limited, Toronto, Ontario, Canada
Filed Sept. 27, 1965, Ser. No. 490,378
14 Claims. (Cl. 99—257)

This invention relates to apparatus for injecting treating fluids into cuts of meat, and in particular, relates to multiple-needle apparatus for the injection of curing pickle into meat cuts which contain bone.

The curing of meat cuts is generally accomplished by dispersion of pickle throughout the product and then allowing time for diffusion to equalize the concentration of the pickle. This equalization of pickle is one of the most important requirements for product uniformity but it is very difficult to achieve in a reasonable length of time because of the imperfect methods presently available for pickle dispersion. For boneless cuts this problem has been largely solved by the development of "injecto curing" machines in which product on a moving belt is repeatedly injected with pickle from an overhead bank of needles. Similar machines have been developed for bone-in products wherein the needles may retract when they strike a bone. These suffer from some disadvantages however. The needles must be large to be strong enough and this requires that they be spaced relatively far apart thus requiring relatively long periods for adequate pickle diffusion. A substantial amount of pickle is lost through the needles which are not surrounded by meat. This pickle must be recovered and the consequent needle blockage and filtration problems present a serious problem. Generally the machines presently available are very complex and consequently very expensive making them unsuitable for small producers.

A common method for introducing pickle solution into certain meat cuts, such as hams, is arterial pumping. However, the distribution of the solution is often uneven due to breakdown of the arterial system. Copending application Ser. No. 393,682, of Henry R. Nordin and Alton G. Steepe, filed Sept. 1, 1964, discloses a multiple needle injection apparatus for injecting pickle solution into a bone-free portion of an artery-pumped meat cut to supply the solution to pickle-deficient areas. While this combined operation produces a satisfactory cure, it is desirable from the standpoint of economy in labor and time to eliminate arterial pumping entirely.

The present invention deals with an apparatus for injecting bone-in cuts which overcomes the aforementioned problems and eliminates the necessity of artery-pumping. The apparatus consists generally of a concave supporting seat for the cut of meat, the seat being perforated for the passage of injection needles. The needles pass through the seat and are arranged with their pointed ends directed to penetrate all fleshy portions of a cut, such as ham. The needles are of such size, spacing and number as to permit a uniform and complete distribution of the curing fluid in the meat throughout the entire depth of the cut. The group of injection needles are mounted on a movable manifold or chamber by which they are bodily projected into the meat but each needle is yieldably mounted for retraction within the manifold so that its feed movement may be arrested in the event it encounters a bone or the like while the remaining needles may continue their penetrating movement into the cut of meat. In addition, the relation of each needle to its supporting means on the manifold is such that substantially all needle openings are either in the meat or within the supporting manifold during the fluid injection period, whereby loss of fluid is avoided. A clamping means is arranged to hold the meat down on its seat while the needles are perforating the meat, which clamp is then released only after the pickle solution is pumped through the needles.

While the following description will be directed particularly to an apparatus and method designed for injecting a pickle solution into hams, it is to be understood that the invention is not limited thereto, that the principles of the invention may be employed for injecting many fluids, such as curing solutions, preservatives, tenderizers, etc. into various cuts of meat.

It is, therefore, an object of this invention to provide an improved apparatus for injection of fluids into cuts of meat.

A further object is to provide a multiple-needle injection apparatus as set forth wherein different needles of the plurality of injection needles are relatively movable to penetrate the meat to different depths so as to avoid damage to the needles upon striking bone.

A further object of the invention is to provide a multiple-needle injection apparatus for injecting fluids into meat cuts wherein a large number of small diameter, closely spaced needles may be employed.

Still another object is to provide improved multiple-needle injection apparatus for bone-in meat cuts wherein the individual injection needles are independently mounted whereby movement of one or more needles may be arrested upon meeting excessive resistance while the remaining needles may continue their movement into the cut of meat.

Another object of the invention is to provide multiple-needle injection apparatus for meat cuts wherein the injection operation and relationship of the needles with respect to their support is such as to avoid loss of curing solution.

Still further and additional objects and advantages will be apparent to those skilled in the art as the description proceeds with reference to the accompanying drawings wherein:

FIG. 1 is a front elevational view of a machine embodying the present invention;

FIG. 2 is a side elevational view of the machine of FIG. 1;

FIG. 3 is a horizontal sectional view taken substantially along the line 3—3 of FIG. 1 but with the cut of meat being omitted;

FIG. 4 is an enlarged sectional view taken along the line 4—4 of FIG. 3;

FIG. 5 is a horizontal sectional view taken along the line 5—5 of FIG. 4;

FIG. 6 is an enlarged detailed view of one of the needles of the present invention;

FIG. 7 is a diagrammatic illustration of the pneumatic cylinder and control valve arrangement; and FIG. 8 is a wiring diagram showing the circuits involved in effecting automatic operation of the machine.

The specific form of apparatus illustrated herein includes a frame structure having vertical tubular frame members 2 and horizontal tubular frame members 4 fitted and welded together in the manner illustrated. Preferably, the tubular members 2 and 4 and other parts of the machine to be described are of stainless steel.

The vertical frame members 2 are provided with adjustable feet 6 at their lower ends whereby they can be adjusted to make firm contact with a floor and to level the apparatus. Certain of the horizontal frame members 4 support a platform 8 upon which a pneumatic double-acting piston and cylinder motor 10 is mounted. The motor 10 comprises an outer cylinder and an inner piston, not shown, including a piston rod 12 extending upwardly therefrom. The upper end of the piston rod 12 is secured to a bracket 14 upon which a hollow chamber 16 is formed. The hollow chamber 16 is provided with laterally extending brackets 18 on which guide rods 20 are fixed. The guide rods 20 extend slidably in guide bushings 22 secured to the frame of the machine and which serve to guide the bracket 14 and chamber 16 in a vertical direction upon the admission of actuating fluid to the motor 10. Projecting upwardly from the top of the hollow chamber 16 is a plurality of injection needles 24, which will be described in more detail later.

The tubular frame of the machine also supports a horizontal table 26, preferably formed of stainless steel or the like, and which table is provided with a depressed seat portion 28 adapted to substantially conform to the outer surface of the cut of meat, such as the ham 30 shown by way of illustration. The seat 28 is provided with a multiplicity of openings 32 therethrough, there being an opening in alignment with each of the needles 24. By reference to FIG. 4, it will be seen that the lower surface of the table 26 is also provided with a block of material 34 having openings 36 therethrough in alignment with the openings 32 and with the needles 24. The lower ends of the openings 36 are beveled and serve to insure entry of the needles 24 into those openings upon upward movement of the chamber 16 in a manner to be described.

The upper part of the machine frame supports a further pneumatic double-acting motor 38 having a piston rod 40 extending downwardly therefrom. Fixed to the lower end of the piston rod 40 is a clamp plate 42 carried by a bracket 44, which in turn is provided with guide rods 46 slidably received in guide bushings 48 on the machine frame. Thus, upon actuation of the motor 38, the clamp plate 42 may be projected downwardly as shown in FIG. 1, to securely hold the cut of meat 30 on the seat 28 or drawn upwardly to release the cut of meat. Also supported on the machine frame is a third pneumatic motor 50 having a forwardly projecting piston rod 52 to which an ejector head 54 is secured. Actuation of the motor 50 to project the piston rod 52 forwardly causes the head 54 to sweep across and over the seat 28 to push a cut of meat from that seat and off the table 26.

Each of the pneumatic motors 10, 38, and 50 is a double-acting, reciprocatory motor. Each end of the motor 10 is connected to a conduit 56 (see FIG. 7) and each conduit is controlled by a solenoid valve 58. In like manner, conduits 60 lead to the ends of motor 38 and are controlled by solenoid actuated valve 62 and conduits 64 lead to the ends of motor 50 and are under control of the solenoid valve 66. Each of the solenoid valves, 58, 62 and 66, is connected to a supply conduit 68 through which air under pressure is conducted from a suitable source, not shown. The valves 58, 62 and 66 are so constructed, as is known to the art, that they may connect either end of their associated motor to the supply conduit 68 while connecting the other end of that motor to exhaust. The structure of the control devices thus far described is substantially the same as that described in the said copending application Ser. No. 393,682, and operation of the solenoid valves is likewise automatically under the control of a suitable timing device driven by a timing motor 80 (FIG. 8). In FIG. 8, the timing device is indicated generally by the broken line rectangle 82. A further description of the operation of the apparatus will be made later.

The hollow chamber 16 previously referred to is shown in greater detail in FIGS. 4 and 5 wherein it is apparent that the chamber is defined by a bottom wall 84, constituting, also a portion of the bracket 14, and upstanding side walls 86. The upper edges of the side walls 86 terminate in outwardly directed flanges 88, upon which a body of material 90 is secured to define the top wall of the chamber 16. The body 90 is a slab of non-corrosive material, preferably of low friction characteristics, capable of providing a sliding seal for needles 24 as will be hereinafter described. A suitable material is polytetrafluoroethylene, readily obtainable on the market under the trademark of Teflon. The body 90 is secured between clamp plates 92 and 94 and the assembly is secured to the flanges 88 by means of bolts 96. The clamp plate 92 rests on the upper ends of the side walls 86 and suitable sealing means 98 are provided therebetween. Extending downwardly from clamp plate 92 are a plurality of spacer rods 100 secured at their lower ends to a further bottom plate 102 and a base plate 104. The base plate 104 is provided with a plurality of spring seats 106 therein and plate 102 is provided with a plurality of openings receiving the lower ends of guide tubes 108, the other ends of which extend into locating recesses 110 in the upper clamp plate 92. Each of the guide tubes 108 is provided with a plurality of openings 112 therethrough so that the interiors of the tubes 108 and the interior of the chamber 16 are in fluid communication.

Upper clamp plate 94 and lower clamp plate 92 are provided with aligned openings 114 therethrough, in alignment with somewhat smaller openings 116 extending through the body 90. The needles 24 are of hollow tubular cylindrical construction and each is slidably received in an opening 116. Thus, the body 90 serves to slidably guide each of the needles 24 and further serves as a sealing means to prevent the leakage of fluid from the chamber 16 along the outer surfaces of the needles 24. It is to be noted that the thickness of the body 90, that is the length of the openings 116, is several times the diameter of a needle 24. Thus, the body 90 serves to accurately guide and support the needles 24 while restraining those needles against any tilting movement in a direction lateral to their length. The inner end 118 of each needle 24 is open whereby the interior of each needle is in fluid communication with the interior of its associated guide tube 108 and thereby with the interior of chamber 16. It is to be noted that the guide tubes 108 and the openings 116 are in concentric axial alignment. A stop block 120 is fixed to each of the needles 24 within its corresponding tube 108 and arranged to abut the lower surface of clamp plate 92 to limit outward sliding movement of the needles. Immediately below each stop block 120 is a resilient bumper element 122 and a washer 124 is slidably arranged on each needle below each bumper 122. A helical compression spring 126 is positioned in each of the guide tubes 108 and at its upper end abuts the washer 124 and at its lower end abuts the bottom of the spring seat 106 previously described. Thus, each needle 24 is normally urged to slide outwardly of the chamber 16 but such outward movement is limited by the stop blocks 120. The springs 126 are so chosen that they, in the extended position shown in FIG. 4, hold the stop blocks 120 against the plate 92 firmly and with sufficient force to project the needles 24 into the flesh of a cut of meat when the chamber is moved upwardly relative to the seat 28. However, if one or more of the needles 24 encounters a bone or other hard material, its upward movement is arrested even though the remaining needles and chamber 16 continue to move upwardly. In all longitudinal positions of each needle, however, its interior is in constant fluid communication with the interior of the chamber 16.

Referring again to FIG. 7 and also to FIG. 2, it will be seen that a flexible conduit 130 is connected to the chamber 16 and to a solenoid actuated valve 132. The valve 132 is further connected through a conduit 134 to a source of fluid under pressure, not shown. As in the case of the copending application referred to, when the solenoid valve 132 is open, pickle fluid or other desired fluid is conducted through the flexible conduit 130 to the interior of the chamber 16 and thence passes out through the hollow needles 24 and their openings 136 into the cut of meat.

Numerals 138 and 140 (FIGS. 1, 2 and 8) designate manually operable starting switches. Two switches are shown, one on each side of the machine, to facilitate operation by an operator standing on either side of the machine. As shown in FIG. 8, closing of either switch 138 or 140 energizes the timer motor 80, which sequentially operates the switches 142, 144, 146 and 148, in a predetermined order. The switch 142 controls solenoid 150 of solenoid valve 62. Switch 144 controls solenoid 152 of solenoid valve 58. Switch 146 controls solenoid 154 which in turn controls valve 132 and switch 148 controls solenoid 156 which operates valve 66.

To operate the machine an operator places a cut of meat, such as a ham 30, on seat 28, then depresses either switch button 138 or 140, depending upon which is the most convenient. Closing of either switch initiates rotation of motor 80 and a sequential operation of the switches 142–148 in the following manner. Switch 142 is first closed and this results in directing air under pressure to the top of motor 38 which forces the hold-down plate 42 downwardly onto the cut of meat to hold it firmly on its seat 28. Thereafter, switch 144 is closed to operate valve 58 to direct air under pressure to the bottom of motor 10, thus forcing the chamber 16 and needles 24 upwardly to project those needles into the cut of meat. At this time switch 142 remains closed and the hold-down plate 42 remains in contact with the meat. When the motor 10 reaches the upper limit of its travel, switch 146 is closed to open valve 132 and admit fluid under pressure through the flexible conduit 130 and this causes injection of the fluid into the meat penetrated by the needles 24. The timer motor then operates to open switch 146 to terminate flow of fluid, then opens switch 144, which results in withdrawal of the needles 24 from the cut of meat and finally switch 142 is opened to retract the hold-down plate 42. Thereafter, switch 148 is closed to admit air under pressure to the rear of ejector motor 50 whereupon ejector head 54 is projected forwardly to push the cut of meat off the seat 28. Finally, switch 148 is opened and ejector head 54 thus retracted. The motor 80 having completed a cycle of operation, automatically stops. The machine is thus in condition for a further cycle of operation after another cut of ham is placed on the seat 28.

It is to be noted that hold-down plate 42 is held on the cut of meat while fluid is being ejected, and preferably until needles 24 are withdrawn. This is for the reason that any springs 126 that may be compressed by virtue of their associated needles having encountered bone could expand and lift the meat off seat 28 unless plate 42 was in its lower position.

In FIG. 8, numeral 160 indicates heating lamps associated with the electrical parts of the machine to prevent condensation of moisture thereon.

It is to be noted that the particular structure and mounting of the needles 24 and the chamber 16 permit the use of small diameter needles and the placing of those needles very close together and thus permits a uniform and thorough impregnation of the cut of meat with the selected treating fluid. The illustrated machine, constructed for injection of a whole ham, contains 72 needles. However, it will be understood that the number of needles and their location and spacing may be varied as desired, particularly with respect to the type of cut being processed.

It will be further noted that the number and position of openings 136 in the needles is varied to suit the contemplated depth of penetration of the particular needle into the meat. For example, in FIG. 4, it will be seen that the outermost needles are provided with openings 136 only part way down the shank while the centrally located needles which penetrate more deeply into the meat are provided with openings 136 further down the shank. If a needle is arrested by striking bone, the lower openings 136 will be within the sealing material 94 during the fluid injection operation. It is contemplated that most of the needle openings 136 will be within the meat or within the sealing material during the fluid injection period. There is no pressure on the injection fluid during the period of needle removal by downward movement of chamber 16. Accordingly, since the needles are upwardly disposed, there is little leakage of fluid while openings 136 are exposed. By this combination of features, loss of treating fluid is negligible.

While a single specific embodiment of the invention is shown and described herein, the same is merely illustrative of the principles of the invention and other embodiments may be resorted to within the scope of the appended claims.

I claim:

1. Apparatus for injecting fluid into a cut of meat, comprising: a support for supporting a cut of meat to be treated; a plurality of openings through said support; wall means defining a chamber; a plurality of fluid injection needles slidably extending through one of said wall means; said chamber being mounted for movement toward and from said support to project said needles through said openings and into a cut of meat on said support; each of said needles being hollow with its interior in communication with the interior of said chamber; yieldable means urging each of said needles to slide outwardly of said chamber; and means for supplying fluid under pressure to the interior of said chamber.

2. Apparatus as defined in claim 1 including movable holding means for holding said cut of meat against said support while said needles are being projected into said cut of meat and injecting fluid thereinto.

3. Apparatus as defined in claim 1 wherein said one wall means comprises a body of polytetrafluoroethylene having openings therethrough and through which said needles slidably extend; said needles being closely spaced and of cylindrical tubular shape, said body serving to slidably guide said needles while substantially preventing loss of fluid from said chamber around said needles.

4. Apparatus as defined in claim 1 including a stop means on each of said needles, within said chamber, and engageable with said one wall means for limiting movement of said needles outwardly of said chamber.

5. In an apparatus for injecting fluid into a cut of meat and wherein a plurality of fluid injection needles are mounted for projection into said meat, the improvement comprising: a wall means defining a closed chamber; a plurality of said hollow fluid injection needles extending slidably through one of said wall means; stop means on each needle, inside said chamber, and engageable with said wall means to limit movement of said needles outwardly of said chamber; compression springs engaging said stop means within said chamber and urging said needles outwardly, the interiors of said hollow needles being in communication with the interior of said chamber; and means for supplying fluid under pressure to the interior of said chamber.

6. Apparatus as defined in claim 5 including guide tubes extending across the interior of said chamber, each tube being aligned with one of said needles, each of said stop means being slidably guided inside its corresponding tube and each of said springs being housed within its corresponding tube; the inner ends of said needles being open to the inside of its tube; and each tube having at least one opening therethrough providing fluid communication between the interiors of said tubes and said chamber.

7. Apparatus as defined in claim 6 wherein said stop means comprise rigid members surrounding and fixed to said needles, resilient bumpers surrounding said needles and abutting the inner ends of said rigid members, and washers slidably surrounding said needles in abutment with the inner ends of said bumpers; said compression springs being of helical form, surrounding the inner ends of said needles, and bearing against said washers.

8. Apparatus as defined in claim 5 wherein said one wall means comprises a body of polytetrafluoroethylene having openings therethrough and through which said needles slidably extend; the lengths of said openings being at least several times the diameter of any of said needles whereby to slideably guide said needles while preventing any substantial lateral tilting thereof.

9. Apparatus as defined in claim 1 wherein said wall means provide a sliding seal for said needles.

10. Apparatus as defined in claim 9 wherein said needles are provided with a plurality of openings along their shank and wherein at least some of these openings are sealed by said wall means upon arrested movement of a needle with respect to forward motion of said chamber.

11. Apparatus as defined in claim 1 wherein said support is a contoured table having a seating surface conforming generally to the outer surface of a cut of meat and wherein said openings through the support and corresponding needles are disposed throughout the contoured area.

12. Apparatus as defined in claim 11 wherein the contoured surface is concave to accommodate a meat cut of generally oval cross-section and the needles disposed at the central portion of the contoured surface are adapted to extend a greater distance through the contoured surface than those disposed at the outer portions of the contoured surface whereby the meat cut may be penetrated to substantially its entire depth throughout.

13. The apparatus as defined in claim 12 wherein the needles are provided with a plurality of fluid injection openings along their shanks and wherein the openings are located only in those portions of the needles that are adapted to penetrate the meat.

14. Apparatus as defined in claim 1 wherein said support provides a table upon which the meat cut is placed for injection and wherein said needles extend upwardly from said chamber for vertically upward movement through the openings in the support.

References Cited
UNITED STATES PATENTS

| | | | |
|---|---|---|---|
| 1,987,349 | 1/1935 | Resmussen | 17—28 |
| 2,560,060 | 7/1951 | Zwosta | 99—256 |
| 2,741,974 | 4/1956 | Avery | 99—257 |
| 2,821,901 | 2/1958 | Abrams | 99—257 |
| 3,016,004 | 1/1962 | Harper et al. | 99—255 |
| 3,035,508 | 5/1962 | Nelson | 99—257 |
| 3,080,809 | 3/1963 | Harris et al. | 99—257 |
| 3,081,691 | 3/1963 | Schmidt | 99—257 |
| 3,296,953 | 1/1967 | Bjorn-Henriksen et al. | 99—256 |

FOREIGN PATENTS

| | | |
|---|---|---|
| 502,486 | 7/1930 | Germany. |
| 534,355 | 10/1955 | Italy. |

BILLY J. WILHITE, *Primary Examiner.*